United States Patent
Morinaga

(10) Patent No.: US 7,474,353 B2
(45) Date of Patent: Jan. 6, 2009

(54) DIGITAL CAMERA AND SWITCH DEVICE

(75) Inventor: Kenichi Morinaga, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 614 days.

(21) Appl. No.: 10/918,979

(22) Filed: Aug. 16, 2004

(65) Prior Publication Data

US 2005/0078209 A1 Apr. 14, 2005

(30) Foreign Application Priority Data

Aug. 19, 2003 (JP) ............... P.2003-295422

(51) Int. Cl.
*H04N 5/225* (2006.01)
*H04N 9/04* (2006.01)
(52) U.S. Cl. .......... 348/373; 348/207.99; 396/347; 200/4
(58) Field of Classification Search ........ 348/375, 348/207.99; 396/347; 200/4
See application file for complete search history.

(56) References Cited

U.S. PATENT DOCUMENTS 5,950,035 A * 9/1999 Sakamoto et al. ........... 396/543

2002/0148712 A1 * 10/2002 Narusawa et al. ........... 200/344

FOREIGN PATENT DOCUMENTS

| JP | 58-134837 | | 9/1983 |
|----|-----------|---|--------|
| JP | 61-65633 | | 5/1986 |
| JP | 6-175207 | | 6/1994 |
| JP | 406175207 | * | 6/1994 |
| JP | 10-208586 | | 8/1998 |
| JP | 10-326536 | | 12/1998 |

OTHER PUBLICATIONS

Office Action for Japanese Application No. 2003-295422, mailed on Mar. 2, 2007, and English translation thereof (3 pages).

* cited by examiner

*Primary Examiner*—Lin Ye
*Assistant Examiner*—Hung H Lam
(74) *Attorney, Agent, or Firm*—Osha • Liang LLP

(57) ABSTRACT

A switch device in a digital camera includes a knob, a body into which a shaft portion of the knob is inserted, a connecting terminal, and a switch board. The knob includes body engaging claws adapted to be engaged with an inner face of the body, terminal engaging portions each having an inclined face part, and a central protrusion and a rotation detent protrusion provided on a lower face of the shaft portion. The body includes a plurality of rotation positioning holes arranged at an inner face side of the body. The connecting terminal includes a bottom plate part having a first hole and a second hole, knob engaging claws adapted to be engaged with the terminal engaging portions, a contact part adapted to come into contact with the switch board, and a positioning projection adapted to be engaged in the rotation positioning holes.

6 Claims, 6 Drawing Sheets

PRIOR ART

PRIOR ART

DIGITAL CAMERA AND SWITCH DEVICE

BACKGROUND OF THE INVENTION

1. Field of the Invention

The present invention relates to a digital camera and a switch device, and more particularly, to the digital camera including the switch device which is provided with a knob having a shaft portion adapted to be rotatably inserted, and the switch device itself.

2. Description of the Related Art

A switch device which is provided with a knob having a shaft portion adapted to be rotatably inserted has been conventionally known (See JP-A-10-208586 and JP-UM-A-61-65633, for example).

In the abovementioned JP-A-10-208586, there is disclosed a first example of the conventional switch device, in which cut-out parts in a sector shape concentric with a rotation center of a joggle knob are formed in an area of a front panel for supporting the joggle knob, and locking claws of the joggle knob are inserted into the cut-outs to be locked. This switch device disclosed in JP-A-10-208586 includes two inclined plates which are arranged at an inner face side of the front panel along a rotation orbit of the locking claws of the joggle knob and adapted to be pushed toward a back face side depending on rotary positions of the joggle knob, and an operation board which is positioned in the back face side of the two inclined plates and provided with a push switch.

In the above mentioned JP-UM-A-61-65633, there is disclosed a second example of the conventional switch device in which an electrically conductive plate is attached to a knob made of resin to be integrated therewith, and locking claws of the knob are engaged with round holes in a printed board. In the switch device disclosed in JP-UM-A-61-65633, a tongue piece of the electrically conductive plate is press fitted into a mounting part of the knob and bent, whereby the electrically conductive plate and the knob are integrated.

In the specification of the present application, as one example of the switch device, a switch device in a digital camera will be described.

FIG. 8 is a perspective view of a digital camera provided with a conventional switch device. FIG. 9 is an exploded perspective view showing a part of the digital camera having the conventional switch device which is shown in FIG. 8. FIG. 10 is a bottom view of the conventional switch device in the digital camera which is shown in FIG. 9. FIG. 11 is a sectional view of the conventional switch device in the digital camera which is shown in FIG. 9, taken along a line 300-300. Referring first to FIGS. 8 to 11, a structure of a digital camera 100 provided with the conventional switch device will be described.

In the digital camera 100 provided with the conventional switch device, as shown in FIG. 8, a switch device 115 is mounted on a switch mounting part 111 which is provided on an upper face of a body 110. This switch device 115 is provided for the purpose of switching over various functions of the digital camera 100. The switch device 115 includes, as shown in FIG. 9, the switch mounting part 111 of the body 110, a knob 120 having a shaft portion 121, a leaf spring member 130, a securing member 140, a screw 150 for fixing the shaft portion, a contact part 160, a screw 170 for fixing the contact part, and a switch board 180.

The switch mounting part 111 has a shaft portion insertion hole 111a, and a leaf spring mounting part 111b. The shaft portion 121 of the knob 120 is rotatably inserted into this shaft portion insertion hole 111a. The leaf spring mounting part 111b is provided so as to surround a circumference of the shaft portion insertion hole 111a. This leaf spring mounting part 111b is provided for the purpose of securing the leaf spring member 130.

The knob 120 is so designed as to switch over the functions of the digital camera 100 through its rotation. The shaft portion 121 of the knob 120 is provided with a female screw part 122 on a lower face thereof, as shown in FIG. 10. This female screw part 122 is provided for the purpose of fitting the shaft portion fixing screw 150, as shown in FIG. 11. Moreover, as shown in FIGS. 10 and 11, recesses 123 are formed on an inner peripheral face of the knob 120 at the lower face side thereof. These recesses 123 are so designed as to be engaged with the leaf spring member 130 at every determined rotation angle, when the knob 120 is rotated. The leaf spring member 130 is mounted on the leaf spring mounting part 111b of the switch mounting part 111 in a fixed manner, as shown in FIGS. 9 and 11. A tip end portion 131 of the leaf spring member 130 is so designed as to be engaged with the recesses 123 of the knob 120, when the knob 120 is rotated. In this manner, rotation angle positions of the knob 120 will be maintained at every determined rotation angle.

The securing member 140 is provided so as to come into contact with the body 110 from an inner face side of the body 110. The securing member 140 has a screw insertion hole 141. As shown in FIG. 11, the shaft portion fixing screw 150 is fitted into the female screw 122 of the knob 120 through the screw insertion hole 141 of the securing member 140 from the inner face side of the body 110. The contact part 160 is fixed to a lower face of the securing member 140 by means of the contact part fixing screw 170.

The contact part 160 is provided so as to come into contact with the switch board 180. This contact part 160 is so designed as to rotate along with the securing member 140 around the shaft portion 121 of the knob 120 as a rotation center, when the knob is rotated. As shown in FIG. 9, the switch board 180 which comes into contact with the contact part 160 is provided with an electrically conductive part 181, at a position corresponding to an orbit of the contact part 160 which rotates around the shaft portion 121 of the knob 120 as the rotation center. This electrically conductive part 181 has a plurality of divided arc-shaped patterns. Because of a plurality of the divided arc-shaped patterns of the electrically conductive part 181, it is possible to switch over contacts at every position of the determined rotation angle, when the knob 120 is rotated.

However, in the digital camera 100 provided with the conventional switch device 115 which is shown in FIG. 9, fixation of the knob 120 to the body 110 has been performed employing the securing member 140 and the shaft portion fixing screw 150. Fixation of the contact part 160 to the securing member 140 has been performed by means of the contact part fixing screw 170. Consequently, there has been a problem that components have increased in number, in the conventional switch device 115 in the digital camera 100. Moreover, there has been another problem that assembling steps have increased in number, because there have been two screwing parts which would take a considerable assembling time.

In the conventional switch device according to the first conventional example disclosed in the above described JP-A-10-208586, the joggle knob is constructed in such a manner that it does not directly press the push switch on the operation board, but it presses two push switches byway of the two inclined plates. In this case, because one push switch has a faculty of switching over only one kind of function, there has been such inconvenience that many inclined plates and many push switches have become necessary, in order to construct the switch device so that it may have a faculty of switching over many functions. Therefore, there has been a problem also in the switch device disclosed in this JP-A-10-208586, that the number of components have increased, in the same manner as in the digital camera 100 provided with the conventional switch device 115 which is shown in FIG. 9.

On the other hand, in the conventional switch device according to the second example which is disclosed in the above described JP-UM-A-61-65633, there has been a problem that assembling steps have been complicated, because on occasion of mounting the electrically conductive plate to the mounting part of the knob, it has been necessary to press-fit the tongue piece of the electrically conductive plate into an end part of the mounting part and to bend it.

SUMMARY OF THE INVENTION

This invention has been made to solve the above described problems, and an object of the invention is to provide a digital camera provided with a switch device in which the number of components and the number of assembling steps can be decreased, and the assembling steps will not be complicated, and the switch device itself.

In order to attain the above described object, according to a first aspect of the invention, there is provided a digital camera including a switch device which includes a knob having a shaft portion, a body of the digital camera having a shaft portion insertion hole into which the shaft portion of the knob is rotatably inserted, a connecting terminal made of material having springy characteristic which is attached to an inner face side of the body and adapted to rotate along with the rotation of the knob, and a switch board having divided arc-shaped patterns which are adapted to be contacted with the connecting terminal, wherein the knob includes a plurality of body engaging claws which are provided on a peripheral face of the shaft portion of the knob and adapted to be engaged with an inner face of the body, a plurality of terminal engaging portions which are provided on the peripheral face of the shaft portion of the knob and respectively have inclined face parts, a central protrusion which is provided on an end face of the shaft portion of the knob at a position corresponding to a rotation center, and a rotation detent protrusion which is provided on the end face of the shaft portion of the knob spaced from the central protrusion by a determined distance, the body includes a plurality of rotation positioning holes for positioning rotation angles of the knob which are arranged on the inner face of the body circumferentially at a determined radius from the rotation center of the knob, each having an oval shape extending in a radial direction with respect to the rotation center of the knob, and the connecting terminal includes a bottom plate part which is attached to the end face of the shaft portion of the knob, and has a first hole adapted to be engaged with the central protrusion of the knob and a second hole adapted to be engaged with the rotation detent protrusion, a plurality of knob engaging claws which are projected from an outer circumference of the bottom plate part toward the knob and adapted to be engaged with a plurality of the terminal engaging portions of the knob, a contact part which is projected from the outer circumference of the bottom plate part to extend toward the switch board and adapted to come into contact with the switch board, and a positioning projection in a semicircular shape which is projected from the outer circumference of the bottom plate part to extend toward the knob and so designed as to be inserted into a plurality of the rotation positioning holes in an oval shape provided in the body, from the inner face of the body.

In the digital camera according to the first aspect of the invention, because the knob of the switch device is so constructed that it includes a plurality of the body engaging claws which are adapted to be engaged with the inner face of the body, it is possible to rotatably mount the knob to the body by means of the body engaging claws, without employing screws and securing members. For this reason, the number of components can be decreased. Moreover, the number of assembling steps can be decreased, because there is no screwing part which would take a considerable assembling time. Further, because the knob is so constructed that it includes a plurality of the terminal engaging portions, and at the same time, the connecting terminal is so constructed that it includes a plurality of the knob engaging claws which are adapted to be engaged with the terminal engaging portions of the knob, it is possible to fix the knob to the connecting terminal without employing the screws or the like. For this reason too, the number of components and the number of assembling steps can be decreased because there is no screw, and the assembling steps will not be complicated, because screwing work and bending work are not required. Still further, it is possible to switch over a plurality of functions by means of the only one connecting terminal, by contacting the connecting terminal with the switch board which has the divided arc-shaped patterns, and by rotating the connecting terminal along with the rotation of the knob. In this manner, it is also possible to prevent an increase of the components in number.

Still further, in the first aspect, because the body is so constructed that it includes, at its inner face side, a plurality of the rotation positioning holes for positioning rotation angles of the knob, and at the same time, the connecting terminal is so constructed that it includes the positioning projection in a semicircular shape which is so designed as to be inserted into the rotation positioning holes, it is possible to maintain the rotation angle position of the knob at every determined rotation angle with respect to the rotation center of the knob, by engaging the positioning projection with either of the rotation positioning holes.

Still further, in the first aspect, because the rotation positioning holes of the body are formed in an oval shape extending in a radial direction with respect to the rotation center of the knob, in case where the rotation center of the connecting terminal attached to the shaft portion of the knob and a center of a plurality of the rotation positioning holes provided in the body are misaligned from each other, an error can be absorbed by the oval shape of the rotation positioning holes. In this manner, it is possible to easily engage the positioning projection of the connecting terminal with the rotation positioning holes at every determined angle.

Still further, in the first aspect, because the terminal engaging portions of the knob are respectively so constructed to have the inclined face parts, when the knob engaging claws of the connecting terminal are engaged with the terminal engaging portions of the knob, it is possible to engage them with the terminal engaging portions of the knob while spreading the knob engaging claws of the connecting terminal along the inclined faces of the inclined face parts. In this manner, the knob can be easily assembled to the connecting terminal, and hence, the number of assembling steps can be decreased.

Still further, in the first aspect, the knob is so constructed that it includes the central protrusion which is provided at the position corresponding to the rotation center on the end face of the shaft portion of the knob, and the rotation detent protrusion which is provided on the end face of the shaft portion of the knob spaced from the central protrusion by a determined distance, and at the same time, the connecting terminal is so constructed that it includes the bottom plate part attached to the lower face of the shaft portion of the knob and having the first hole adapted to be engaged with the central protrusion of the knob and the second hole adapted to be engaged with the rotation detent protrusion. Accordingly, the rotation axes of the knob and the connecting terminal can be easily aligned by the central protrusion, and deviation of the connecting terminal in the rotary position with respect to the knob can be restrained by means of the central protrusion and the rotation detent protrusion. In this manner, when the knob is rotated, the contact part of the connecting terminal adapted to come into contact with the switch board can be more accurately moved with respect to the switch board, and hence, switching operation of the functions by rotating the knob can be performed more accurately.

A switch device according to a second aspect of the invention includes a knob having a shaft portion, a body having a shaft portion insertion hole into which the shaft portion of the knob is rotatably inserted, a connecting terminal made of material having springy characteristic which is attached to the shaft portion of the knob at an inner face side of the body, a switch board having divided patterns which are adapted to be contacted with the connecting terminal, wherein the knob includes a body engaging portion adapted to be engaged with the inner face of the body, and a terminal engaging portion, and the connecting terminal includes a knob engaging portion adapted to be engaged with the terminal engaging portion of the knob, and a contact part adapted to come into contact with the switch board.

In the digital camera according to the second aspect of the invention, because the knob of the switch device is so constructed that it includes the body engaging portion adapted to be engaged with the inner face of the body, it is possible to rotatably mount the knob to the body by means of the body engaging portion, without employing screws and securing members. For this reason, the number of components can be decreased. Moreover, the number of assembling steps can be decreased, because there is no screwing part which would take a considerable assembling time. Further, because the knob is so constructed that it includes the terminal engaging portion, and at the same time, the connecting terminal is so constructed that it includes the knob engaging portion adapted to be engaged with the terminal engaging portion of the knob, it is possible to fix the knob to the connecting terminal without employing the screws or the like. For this reason too, the number of components and the number of assembling steps can be decreased because there is no screw, and the assembling steps will not be complicated, because screwing work and bending work are not required. Still further, it is possible to switch over a plurality of functions by means of the only one connecting terminal, by contacting the connecting terminal with the switch board which has the divided arc-shaped patterns, and by rotating the connecting terminal along with the rotation of the knob. In this manner, it is also possible to prevent an increase of the components in number.

In the switch device according to the above described second aspect, the body preferably includes a plurality of rotation positioning holes for positioning rotation angles of the knob which are arranged at an inner face side of the body, and the connecting terminal includes a positioning projection which is so designed as to be inserted into a plurality of the rotation positioning holes provided in the body, from the inner face of the body. Being constructed in this manner, it is possible to maintain a determined rotation angle position of the knob, at every determined rotation angle with respect to the rotation center of the knob, by engaging the positioning projection with either of the rotation positioning holes.

In this case, each of the rotation positioning holes in the body is preferably formed in an oval shape extending in a radial direction with respect to the rotation center of the knob. Being constructed in this manner, in case where the rotation center of the connecting terminal attached to the shaft portion of the knob and the center of a plurality of the rotation positioning holes provided in the body are misaligned from each other, an error can be absorbed by the oval shape of the rotation positioning holes. In this manner, it is possible to easily engage the positioning projection of the connecting terminal with either of the rotation positioning holes, at every determined angle.

In the switch device according to the above described second aspect, the terminal engaging portion of the knob preferably has an inclined face part. Being constructed in this manner, when the knob engaging portion of the connecting terminal is engaged with the terminal engaging portion of the knob, the knob engaging portion can be engaged with the terminal engaging portion of the knob while spreading the knob engaging portion of the connecting terminal along the inclined face of the inclined face part. As the results, the knob can be easily assembled to the connecting terminal, and hence, the number of assembling steps can be decreased.

In the switch device according to the above described second aspect, the knob preferably includes a central protrusion provided on an end face of the shaft portion of the knob at a position corresponding to the rotation center, and a rotation detent protrusion provided on the end face of the shaft portion of the knob spaced from the central protrusion by a determined distance, and the connecting terminal includes a bottom plate part which is attached to the end face of the shaft portion of the knob, and has a first hole adapted to be engaged with the central protrusion of the knob and a second hole adapted to be engaged with the rotation detent protrusion. Being constructed in this manner, the rotation axes of the knob and the connecting terminal can be easily aligned by the central protrusion, and deviation of the connecting terminal in the rotation position with respect to the knob can be restrained by means of the central protrusion and the rotation detent protrusion. In this manner, when the knob is rotated, the contact part of the connecting terminal adapted to come into contact with the switch board can be more accurately moved with respect to the switch board, and hence, switching operation of the functions by rotating the knob can be performed more accurately.

BRIEF DESCRIPTION OF THE DRAWINGS

These and other objects and advantages of this invention will become more fully apparent from the following detailed description taken with the accompanying drawings in which.

DETAILED DESCRIPTION OF THE PREFERRED EMBODIMENTS

Figure 1:
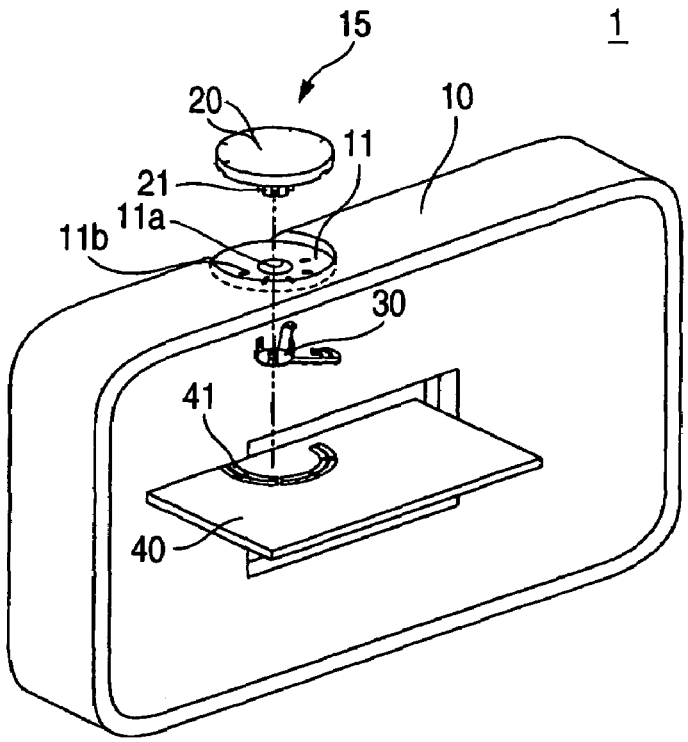
FIG. 1 is an exploded perspective view showing a part of a digital camera including a switch device according to an embodiment of the invention.
Figure 2:
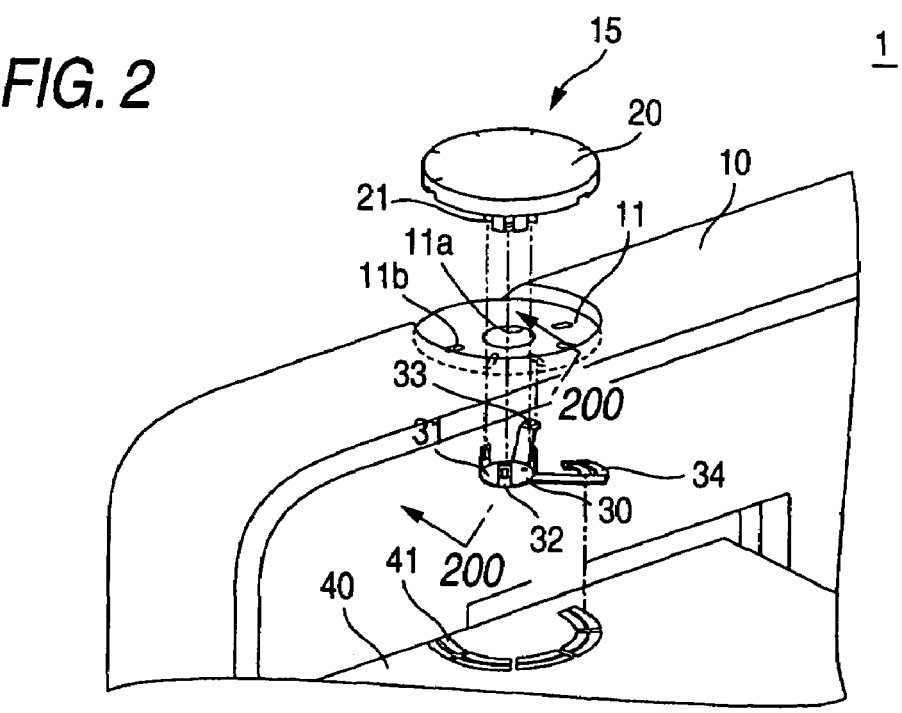
FIG. 2 is an enlarged view of a part of FIG. 1.
Figure 6:
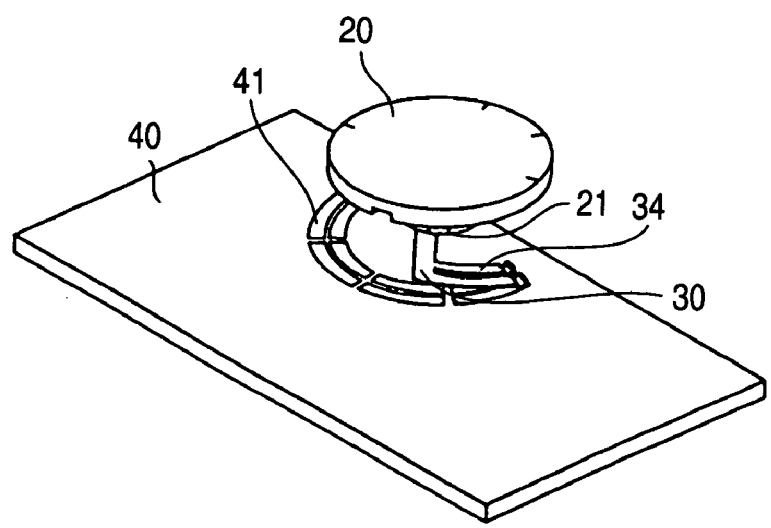
FIG. 6 is a perspective view showing relative arrangement of the connecting terminal with respect to a switch board of the switch device in the digital camera according to the embodiment of the invention as shown in FIG. 1.
Figure 7:
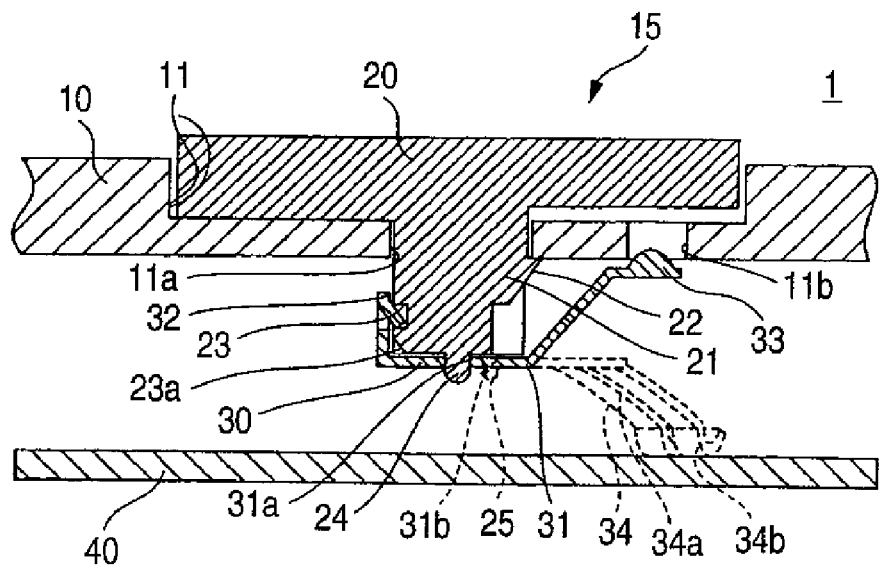
FIG. 7 is a sectional view of the switch device in the digital camera according to the embodiment of the invention as shown in FIG. 2, taken along a line 200-200.
Figure 8:
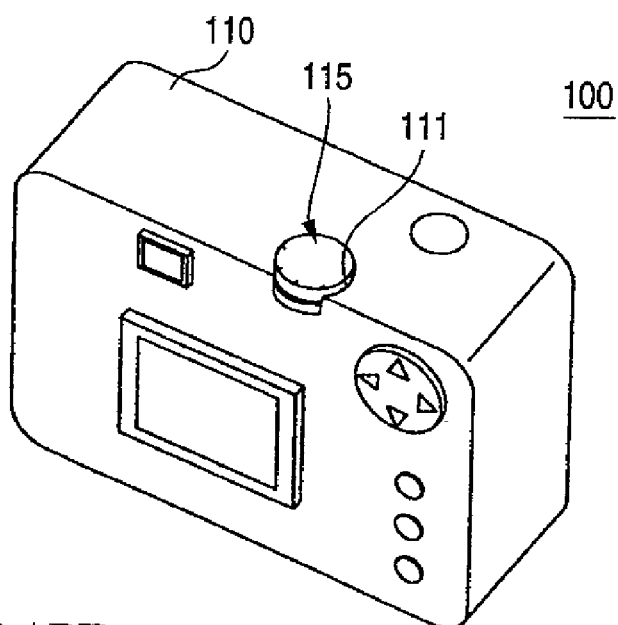
FIG. 8 is a perspective view of a digital camera provided with a conventional switch device.
Figure 9:
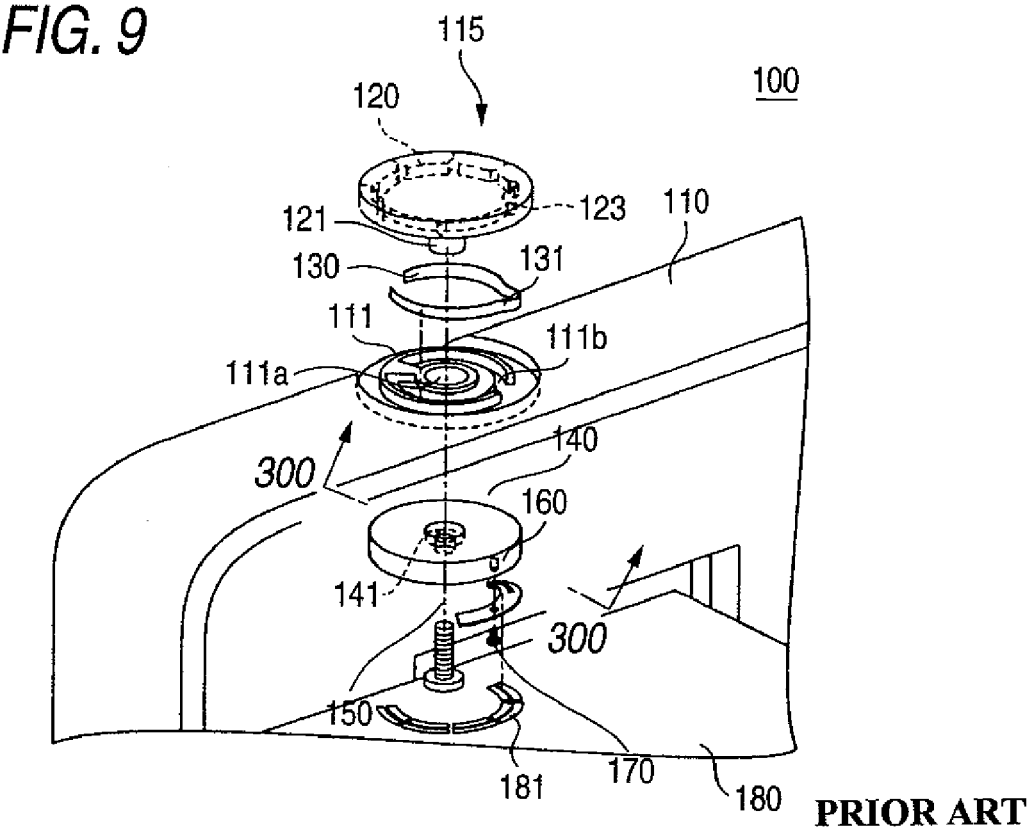
FIG. 9 is an exploded perspective view showing a part of the digital camera including the conventional switch device.
Figure 10:
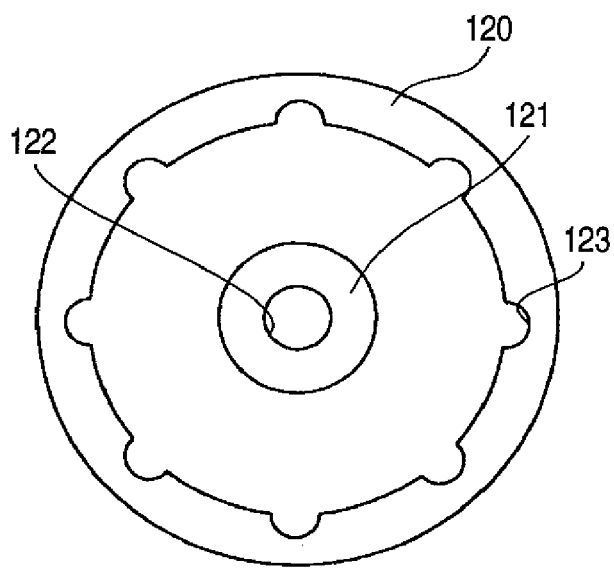
FIG. 10 is a bottom view of a knob of the conventional switch device in the digital camera as shown in FIG. 9.
Figure 11:
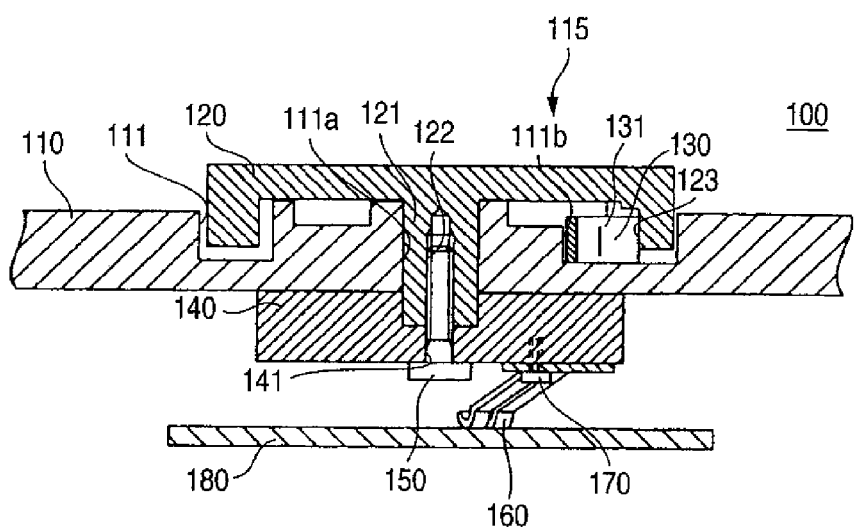
FIG. 11 is a sectional view of the conventional switch device in the digital camera as shown in FIG. 9, taken along a line 300-300.

FIG. 1 is an exploded perspective view showing a part of a digital camera including a switch device according to an embodiment of the invention, and FIG. 2 is an enlarged view of a part of FIG. 1. FIGS. 3 to 6 are perspective views showing particulars of constituting components of the switch device in the digital camera according to the embodiment of the invention. FIG. 7 is a sectional view of the switch device in the digital camera according to the embodiment of the invention which is shown in FIG. 2, taken along a line 200-200. Referring first to FIGS. 1 to 7, a structure of the digital camera 1 provided with the switch device according to the embodiment of the invention will be described.

In the digital camera 1 according to the embodiment of the invention, a switch device 15 is mounted on a switch mounting part 11 which is provided on an upper face of a body 10 formed of resin, as shown in FIGS. 1 and 2. This switch device 15 is provided for the purpose of switching over functions of the digital camera 1. The switch device 15 includes the switch mounting part 11 of the body 10, a knob 20 formed of resin and having a shaft portion 21, a connecting terminal 30 made of a leaf spring, and a switch board 40 (a printed board).

The switch mounting part 11 has a shaft portion insertion hole 11a and rotation positioning holes 11b. The shaft portion 21 of the knob 20 is rotatably inserted into this shaft portion insertion hole 11a. The functions of the digital camera 1 can be switched over by rotating the knob 20.

Figure 3:
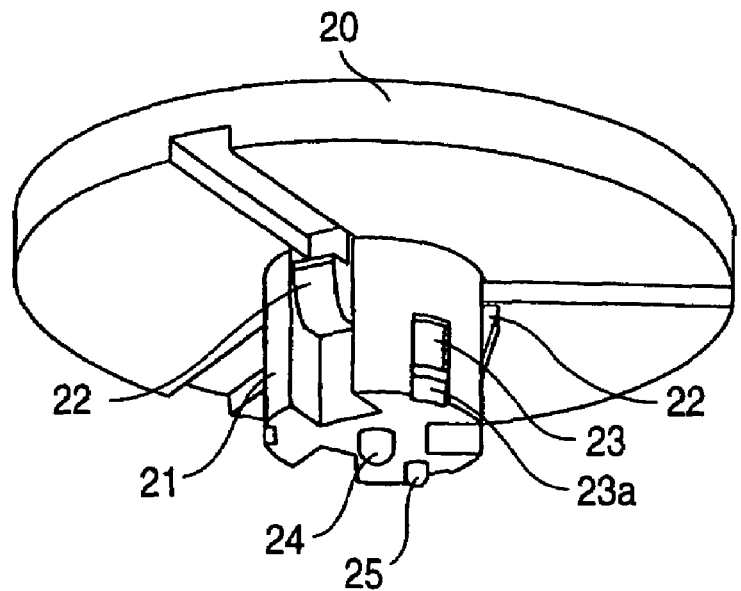
FIG. 3 is a perspective view showing a knob of the switch device in the digital camera according to the embodiment of the invention as shown in FIG. 1.

Herein, in this embodiment, a plurality of the rotation positioning holes 11b of the switch mounting part 11 are circumferentially arranged at a determined radius from a rotation center of the knob 20, as shown in FIGS. 1, 2 and 7. Each of the rotation positioning holes 11b is formed in an oval shape extending in a radial direction with respect to the rotation center of the knob 20. Moreover, as shown in FIG. 3, the shaft portion 21 of the knob 20 is provided, on its peripheral face, with three body engaging claws 22 which are arranged equidistantly at every 120 degree, when viewed from a lower face of the shaft portion 21. As shown in FIG. 7, these body engaging claws 22 are so designed as to be engaged with the switch mounting part 11 of the body 10 from an inner face side of the body 10, when the shaft portion 21 of the knob 20 has been inserted into the shaft portion insertion hole 11a. Further, as shown in FIG. 3, the shaft portion 21 is provided with three terminal engaging portions 23 equidistantly at every 120 degree on the peripheral face, which are respectively displaced by 60 degree from the three body engaging claws 22. As shown in FIGS. 3 and 7, each of the terminal engaging portions 23 is provided with an inclined face part 23a. This inclined face part 23a is provided on the terminal engaging portion 23 in an area adjacent to the lower face of the shaft portion 21, and inclined so as to be enlarged in diameter from the lower face toward a base end part of the shaft portion 21. This inclined face part 23a is provided for the purpose of facilitating engagement between the knob 20 and the connecting terminal 30.

Figure 5:
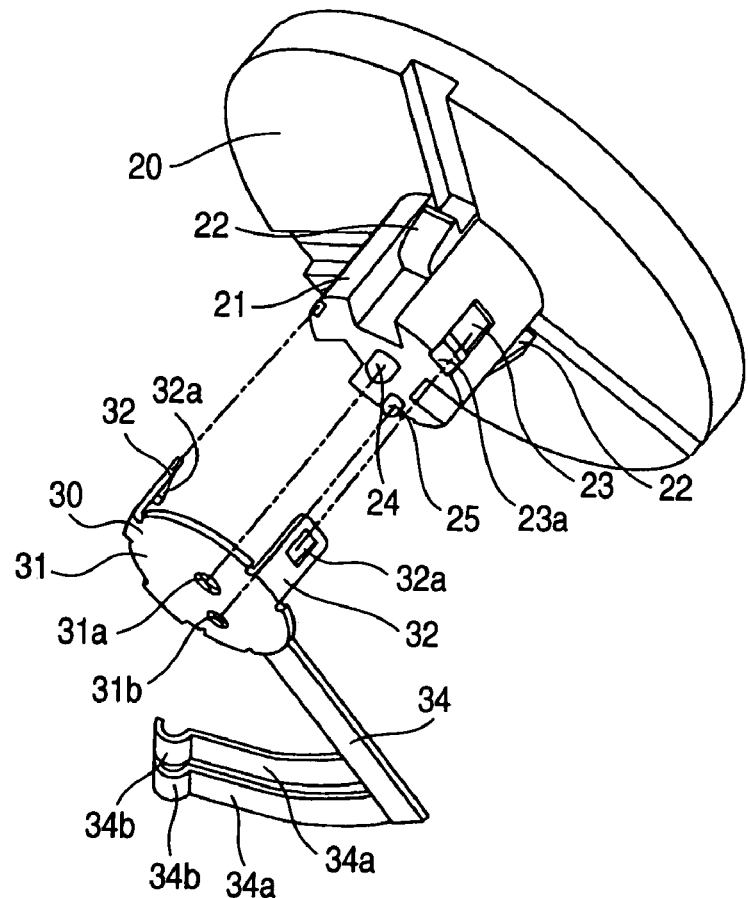
FIG. 5 is a perspective view showing relative engagement of the knob with respect to the connecting terminal of the switch device in the digital camera according to the embodiment of the invention as shown in FIG. 1.

As shown in FIGS. 5 and 7, the shaft portion 21 is provided, at a position on its lower face corresponding to the rotation center, with a central protrusion 24 for the purpose of enabling rotation axes of the knob 20 and the connecting terminal 30 to be aligned. The shaft portion 21 is further provided, at a position on the lower face spaced from the central protrusion 24 by a determined distance, with a rotation detent protrusion 25 for stopping rotation of the connecting terminal 30 with respect to the knob 20.

Figure 4:
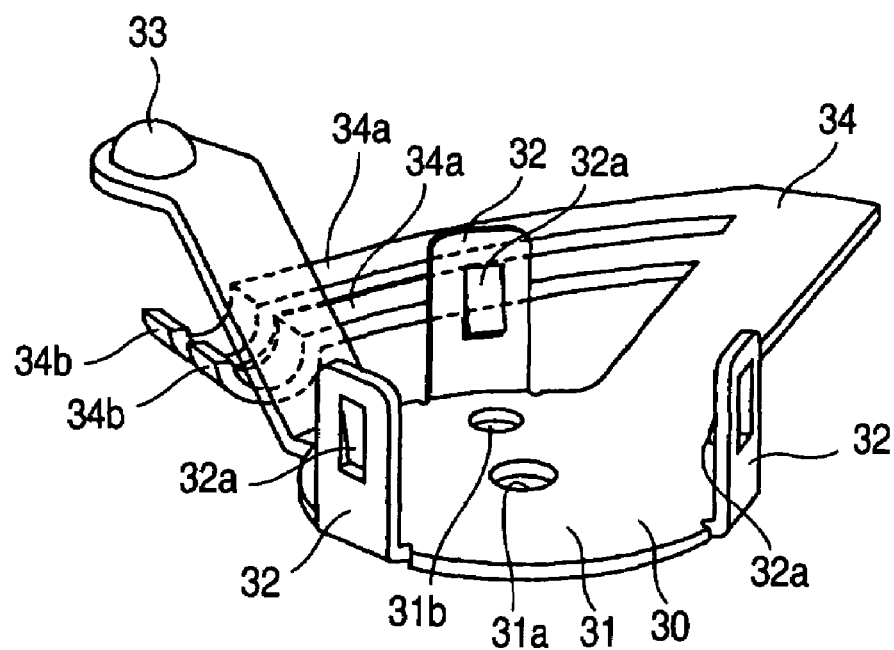
FIG. 4 is a perspective view showing a connecting terminal of the switch device in the digital camera according to the embodiment of the invention as shown in FIG. 1.

The connecting terminal 30 has a bottom plate part 31, as shown in FIGS. 4 and 7. This bottom plate part 31 is attached to the lower face of the shaft portion 21 of the knob 20. The bottom plate part 31 has a first hole 31a adapted to be engaged with the central protrusion 24 of the knob 20, and a second hole 31b adapted to be engaged with the rotation detent protrusion 25 of the knob 20. As shown in FIG. 4, the connecting terminal 30 is further provided with three knob engaging claws 32 which are projected equidistantly from an outer circumference of the bottom plate part 31 toward the knob 20. Each of the knob engaging claws 32 has a hook portion 32a which is formed in a U-shape by cutting out a part of a plate-like portion and bending it inwardly. These hook portions 32a of the knob engaging claws 32 are adapted to be engaged with the three terminal engaging portions 23 provided on the peripheral face of the shaft portion 21 of the knob 20, as shown in FIGS. 5 and 7.

The connecting terminal 30 is further provided with a positioning projection 33 in a semicircular shape which is projected from the outer circumference of the bottom plate part 31 to extend toward the knob 20. This positioning projection 33 is so designed as to be inserted into a plurality of the rotation positioning holes 11b in an oval shape which are formed in the switch mounting part 11 of the body 10. As shown in FIGS. 4, 6 and 7, the connecting terminal 30 has a contact part 34 which is projected from the outer circumference of the bottom plate part 31 to extend toward the switch board 40. This contact part 34 has leg portions 34a and contacting portions 34b which are composed of two branched parts. The contacting portions 34b are formed in a U-shape at distal ends of the leg portions 34a.

As shown in FIGS. 1 and 2, the switch board 40 is arranged below the connecting terminal 30 which is provided inside the body 10. As shown in FIG. 6, the switch board 40 is provided with an electrically conductive part 41 at a position corresponding to orbits which are drawn by the contacting portions 34b of the contact part 34, when the knob 20 is rotated. This electrically conductive part 41 has a plurality of divided arc-shaped patterns. When the knob 20 is rotated, contacts can be switched over at every determined rotation angle, according to a plurality of the divided arc-shaped patterns of the electrically conductive part 41.

As described above, in this embodiment, because the knob 20 of the switch device 15 is provided with the three body engaging claws 22 which are adapted to be engaged with the inner face of the body 10, it is possible to rotatably mount the knob 20 to the body 10 by means of the body engaging claws 22, without employing screws and securing members as in the prior art. For this reason, the number of components can be decreased. Moreover, the number of assembling steps can be decreased, because there is no screwing part which would take a considerable assembling time.

Moreover, in this embodiment, because the knob 20 is provided with the three terminal engaging portions 23, and at the same time, the connecting terminal 30 is provided with the three knob engaging claws 32 which are adapted to be engaged with the terminal engaging portions 23, it is possible to fix the knob 20 to the connecting terminal 30 without employing the screws or the like. For this reason too, the number of components and the number of assembling steps can be decreased because there is no screw, and the assembling steps will not be complicated, because screwing work and bending work are not required.

Further, in this embodiment, it is possible to switch over a plurality of functions by means of the only one connecting terminal 30, by contacting the connecting terminal 30 with the switch board 40 which has the divided arc-shaped patterns, and by rotating the connecting terminal 30 along with the rotation of the knob 20. In this manner, it is possible to prevent an increase of the components in number.

Still further, in this embodiment, because the switch mounting part 11 of the body 10 is provided with a plurality of the rotation positioning holes 11b for positioning rotation angles of the knob 20, and at the same time, the connecting terminal 30 is provided with the positioning projection 33 in a semicircular shape which is so designed as to be inserted into a plurality of the rotation positioning holes 11b, it is possible to maintain the determined rotation angle position of the knob 20 at every determined angle with respect to the rotation center of the knob 20, by engaging the positioning projection 33 with either of the rotation positioning holes 11b.

Still further, in this embodiment, because the rotation positioning holes 11b of the body 10 are formed in an oval shape extending in a radial direction with respect to the rotation center of the knob 20, in case where the rotation center of the connecting terminal 30 attached to the shaft portion 21 of the knob 20 and the center of the plurality of the rotation positioning holes 11b provided in the body 10 are misaligned from each other, an error can be absorbed by the oval shape of the rotation positioning holes 11b. In this manner, it is possible to easily engage the positioning projection 33 of the connecting terminal 30 with the rotation positioning holes 11b at every determined angle.

Still further, in this embodiment, because the terminal engaging portions 23 of the knob 20 are respectively provided with the inclined face parts 23a, when the knob engaging claws 32 of the connecting terminal 30 are engaged with the terminal engaging portions 23 of the knob 20, it is possible to engage them with the terminal engaging portions 23 of the knob 20 while spreading the knob engaging claws 32 of the connecting terminal 30 along the inclined faces of the inclined face parts 23a. As the results, the knob 20 can be easily assembled to the connecting terminal 30, and hence, the number of assembling steps can be decreased.

Still further, in this embodiment, the knob 20 has the central protrusion 24 which is provided at the position corresponding to the rotation center on the lower face of the shaft portion 21 of the knob 20, and the rotation detent protrusion 25 which is provided on the lower face of the shaft portion 21 of the knob 20 spaced from the central protrusion 24 by a determined distance, and at the same time, the connecting terminal 30 has the bottom plate part 31 attached to the lower face of the shaft portion 21 of the knob 20 and having the first hole 31a adapted to be engaged with the central protrusion 24 of the knob 20 and the second hole 31b adapted to be engaged with the rotation detent protrusion 25. Accordingly, the rotation axes of the knob 20 and the connecting terminal 30 can be easily aligned by the central protrusion 24, and deviation of the connecting terminal 30 in the rotation position with respect to the knob 20 can be restrained by means of the central protrusion 24 and the rotation detent protrusion 25. In this manner, when the knob 20 is rotated, the contact part 34 of the connecting terminal 30 adapted to come into contact with the switch board 40 can be more accurately moved with respect to the switch board 40, and hence, switching operation of the functions by rotating the knob 20 can be performed more accurately.

It should be considered that the embodiment disclosed herein is only by way of example in all respect and is not limitative. A scope of the invention will be represented only by the scope of claims for patent but not by the description of the above described embodiment, and further, will include all modifications equivalent to and within the scope of the claims for patent.

For example, although a case wherein the invention is applied to the switch device in the digital camera has been referred to in the above described embodiment, the invention is not limited to this case, but can be also applied to other switch devices than the switch device in the digital camera.

What is claimed is:

1. A digital camera comprising:
    a switch device which includes a knob having a shaft portion; a body of the digital camera having a shaft portion insertion hole into which the shaft portion of the knob is rotatably inserted;
    a connecting terminal made of material having springy characteristic which is attached to an inner face side of the body and adapted to rotate along with the rotation of the knob; and a switch board having divided arc-shaped patterns which are adapted to be contacted with the connecting terminal, wherein: the knob includes: a plurality of body engaging claws which are provided on a peripheral face of the shaft portion of the knob, and adapted to be engaged with an inner face of the body;
    a plurality of terminal engaging portions which are provided on the peripheral face of the shaft portion of the knob, and respectively have inclined face parts;
    a central protrusion which is provided on an end face of the shaft portion of the knob at a position corresponding to a rotation center; and
    a rotation detent protrusion which is provided on the end face of the shaft portion of the knob spaced from the central protrusion by a determined distance;
    the body includes a plurality of rotation positioning holes for positioning rotation angles of the knob which are arranged on the inner face of the body circumferentially at a determined radius from the rotation center of the knob, each having an oval shape extending in a radial direction with respect to the rotation center of the knob; and
    the connecting terminal includes:
        a bottom plate part which is attached to the end face of the shaft portion of the knob, and has a first hole adapted to be engaged with the central protrusion of the knob and a second hole adapted to be engaged with the rotation detent protrusion;
        a plurality of knob engaging claws which are projected from an outer circumference of the bottom plate part toward the knob, and adapted to be engaged with a plurality of the terminal engaging portions of the knob; a contact part which is projected from the outer circumference of the bottom plate part to extend toward the switch board, and adapted to come into contact with the switch board; and a positioning projection in a semicircular shape which is projected from the outer circumference of the bottom plate part to extend toward the knob, and so designed as to be inserted into a plurality of the rotation positioning holes in an oval shape provided in the body, from the inner face of the body.

2. A switch device comprising:

a knob having a shaft portion comprising a recess portion;

a body having a shaft portion insertion hole into which the shaft portion of the knob is rotatably inserted;

a connecting terminal made of material having springy characteristic which is attached to the shaft portion of the knob at an inner face side of the body; and a switch board having divided patterns which are adapted to be contacted with the connecting terminal, wherein:

the knob is monolithically formed with:

a body engaging portion adapted to be engaged with the inner face of the body; and a terminal engaging portion; and the connecting terminal includes:

a knob engaging portion, adapted to be engaged with the terminal engaging portion of the knob; and a contact part adapted to come into contact with the switch board, wherein the body engaging portion is disposed on the recess portion so that a claw portion of the body engaging portion projects outwardly.

3. A switch device according to claim 2, wherein the body includes a plurality of rotation positioning holes for positioning rotation angles of the knob which are arranged at an inner face side of the body; and the connecting terminal includes a positioning projection which is so designed as to be inserted into a plurality of the rotation positioning holes provided in the body, from the inner face of the body.

4. A switch device according to claim 3, wherein each of the rotation positioning holes in the body is formed in an oval shape extending in a radial direction with respect to a rotation center of the knob.

5. A switch device according to claim 2, wherein the terminal engaging portion of the knob has an inclined face part.

6. A switch device comprising:

a knob having a shaft portion;

a body having a shaft portion insertion hole into which the shaft portion of the knob is rotatably inserted;

a connecting terminal made of material having springy characteristic which is attached to the shaft portion of the knob at an inner face side of the body; and a switch board having divided patterns which are adapted to be contacted with the connecting terminal, wherein the knob includes:

a body engaging portion adapted to be engaged with the inner face of the body; and a terminal engaging portion;

a central protrusion provided on an end face of the shaft portion of the knob at a position corresponding to the rotation center; and a rotation detent protrusion provided on the end face of the shaft portion of the knob spaced from the central protrusion by a determined distance; and the connecting terminal includes:

a knob engaging portion adapted to be engaged with the terminal engaging portion of the knob;

a contact part adapted to come into contact with the switch board; and a bottom plate part which is attached to the end face of the shaft portion of the knob, and has a first hole adapted to be engaged with the central protrusion of the knob and a second hole adapted to be engaged with the rotation detent protrusion.

* * * * *